(12) United States Patent
Adams

(10) Patent No.: US 8,992,358 B2
(45) Date of Patent: Mar. 31, 2015

(54) AUTOMOTIVE TIMING CHAIN SYSTEM COMPONENT AND METHOD THEREOF

(75) Inventor: Bradley F. Adams, Homer, NY (US)

(73) Assignee: BorgWarner Inc., Auburn Hills, MI (US)

( * ) Notice: Subject to any disclaimer, the term of this patent is extended or adjusted under 35 U.S.C. 154(b) by 145 days.

(21) Appl. No.: 13/202,421

(22) PCT Filed: Feb. 23, 2010

(86) PCT No.: PCT/US2010/024969
§ 371 (c)(1),
(2), (4) Date: Aug. 19, 2011

(87) PCT Pub. No.: WO2010/099074
PCT Pub. Date: Sep. 2, 2010

(65) Prior Publication Data
US 2011/0306449 A1    Dec. 15, 2011

Related U.S. Application Data

(60) Provisional application No. 61/156,200, filed on Feb. 27, 2009.

(51) Int. Cl.
*F16H 7/08* (2006.01)
*F16H 7/18* (2006.01)
*B21D 26/033* (2011.01)

(52) U.S. Cl.
CPC .............. *F16H 7/18* (2013.01); *B21D 26/033* (2013.01); *F16H 7/08* (2013.01); *F16H 2007/0842* (2013.01); *F16H 2007/0872* (2013.01)
USPC .......................................... 474/111; 474/140

(58) Field of Classification Search
CPC ..... F16H 2007/0872; F16H 7/08; F16H 7/18; F16H 2007/0804; F16H 2007/0806
USPC .................................................. 474/111, 140
See application file for complete search history.

(56) References Cited

U.S. PATENT DOCUMENTS 4,826,468 A * 5/1989 Friedrichs ...................... 474/101
5,045,032 A * 9/1991 Suzuki et al. .................. 474/140
5,184,983 A * 2/1993 Shimaya et al. ............... 474/111

(Continued)

FOREIGN PATENT DOCUMENTS

CN    1807929 A    7/2006
EP    1400725 A2    3/2004

(Continued)

OTHER PUBLICATIONS

European Search Report dated Oct. 15, 2012; Application SN: 10746687.2; Applicant: BorgWarner Inc.; 6 pages.

(Continued)

*Primary Examiner* — Michael Mansen
*Assistant Examiner* — Henry Liu
(74) *Attorney, Agent, or Firm* — BrooksGroup

(57) ABSTRACT

One embodiment may include an automotive timing chain system component (10, 12) such as a tensioner arm (10) or a chain guide (12) that, during use, bears directly or indirectly against a chain (22) of an automotive timing chain system (14). The component (10, 12) may have an elongated body (16, 116) made into a generally hollow shape by a hydroforming process. The body may have a first open free end (26, 126) and a second open free end (28, 128).

13 Claims, 3 Drawing Sheets

(56) References Cited

U.S. PATENT DOCUMENTS

| | | | |
|---|---|---|---|
| 5,222,917 A | 6/1993 | Shimaya et al. | |
| 5,318,482 A * | 6/1994 | Sato et al. | 474/111 |
| 5,435,205 A | 7/1995 | Seksaria et al. | |
| 5,720,682 A | 2/1998 | Tada | |
| 5,797,818 A | 8/1998 | Young | |
| 5,813,935 A | 9/1998 | Dembosky et al. | |
| 5,820,502 A * | 10/1998 | Schulze | 474/140 |
| 5,961,411 A | 10/1999 | Tsutsumi et al. | |
| 6,013,000 A * | 1/2000 | Moretz | 474/111 |
| 6,257,035 B1 | 7/2001 | Marks et al. | |
| 6,302,816 B1 | 10/2001 | Wigsten | |
| 6,428,435 B1 * | 8/2002 | Kumakura et al. | 474/111 |
| 6,513,407 B1 | 2/2003 | Higgins | |
| 6,572,502 B1 | 6/2003 | Young et al. | |
| 6,634,974 B2 * | 10/2003 | Fujiwara et al. | 474/111 |
| 6,645,102 B2 * | 11/2003 | Kumakura | 474/111 |
| 6,884,192 B2 * | 4/2005 | Konno et al. | 474/111 |
| 6,890,277 B2 * | 5/2005 | Inoue et al. | 474/111 |
| 6,939,259 B2 * | 9/2005 | Thomas et al. | 474/111 |
| 6,988,971 B2 * | 1/2006 | Konno | 474/111 |
| 7,056,243 B2 * | 6/2006 | Konno | 474/111 |
| 7,074,145 B2 | 7/2006 | Konno et al. | |
| 7,163,479 B2 * | 1/2007 | Young | 474/140 |
| 7,252,609 B2 * | 8/2007 | Hashimoto | 474/111 |
| 2002/0004433 A1 | 1/2002 | Fujiwara et al. | |
| 2004/0067806 A1 * | 4/2004 | Markley et al. | 474/110 |
| 2004/0255463 A1 * | 12/2004 | Kiehl | 29/897.2 |
| 2005/0049095 A1 * | 3/2005 | Shum | 474/140 |
| 2005/0096167 A1 * | 5/2005 | Konno et al. | 474/111 |
| 2005/0107196 A1 * | 5/2005 | Konno et al. | 474/111 |
| 2005/0217417 A1 | 10/2005 | Uchida et al. | |
| 2006/0108837 A1 * | 5/2006 | Deme et al. | 296/203.02 |
| 2006/0205548 A1 * | 9/2006 | Konno | 474/111 |
| 2008/0032836 A1 * | 2/2008 | Konno et al. | 474/140 |
| 2009/0011879 A1 * | 1/2009 | Sakamoto | 474/111 |
| 2009/0036242 A1 * | 2/2009 | Hayami et al. | 474/111 |

FOREIGN PATENT DOCUMENTS

| | | |
|---|---|---|
| EP | 1471285 A1 | 10/2004 |
| JP | 8254253 A | 10/1996 |
| JP | 08004848 A | 12/1996 |
| JP | 10213192 A | 8/1998 |
| JP | 2000097300 A | 4/2000 |
| JP | 2000266141 A | 9/2000 |
| JP | 2005254883 A | 9/2005 |
| JP | 2008280789 A | 11/2008 |
| JP | 2009014110 A | 1/2009 |

OTHER PUBLICATIONS

Chinese Office Action dated Jul. 1, 2013; Applicant: BorgWarner Inc; Application No. 201080007305.5; 13 pages.

Japanese Office Action dated Jul. 12, 2013; Applicant: BorgWarner Inc; Application No. 2011-552077; 11 pages.

Chinese Office Action dated Jul. 29, 2014 ; Application No. 201080007305.5 ; Applicant : BorgWarner Inc. ; 17 pages.

SAE International ; Development of Hydroformed High Strength Steel Chassis Part; www.sae.org/technical/papers/2005-01-0091 ; Document No. 2005-01-0091 ; date published : Apr. 2005 ; 2 pages.

Chinese Office Action dated Feb. 8, 2014; Applicant: BorgWarner Inc.; Application No. 201080007305.5; 17 pages.

* cited by examiner

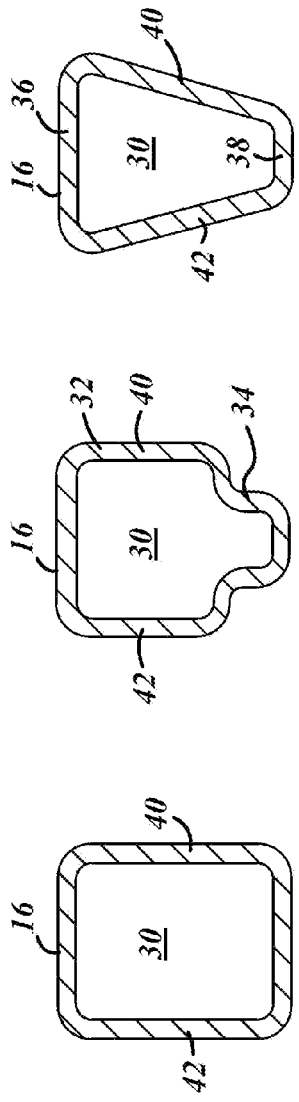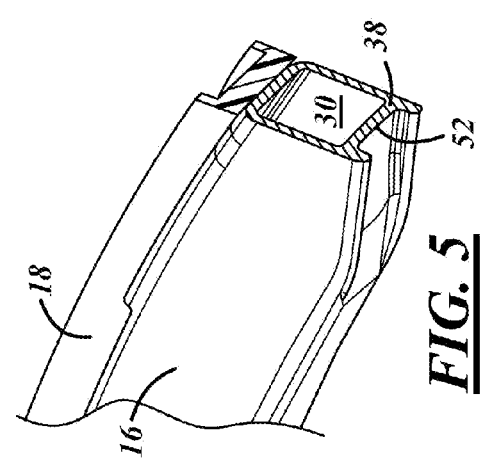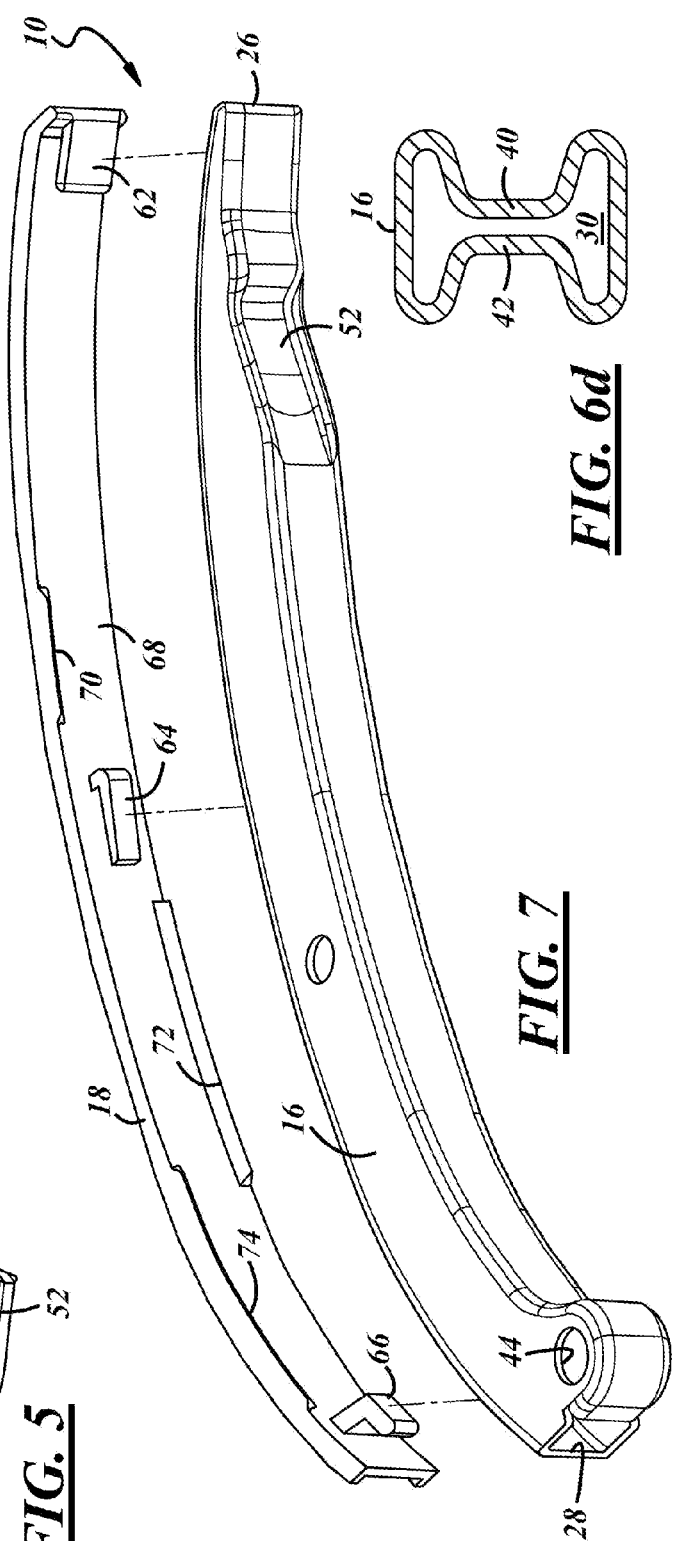

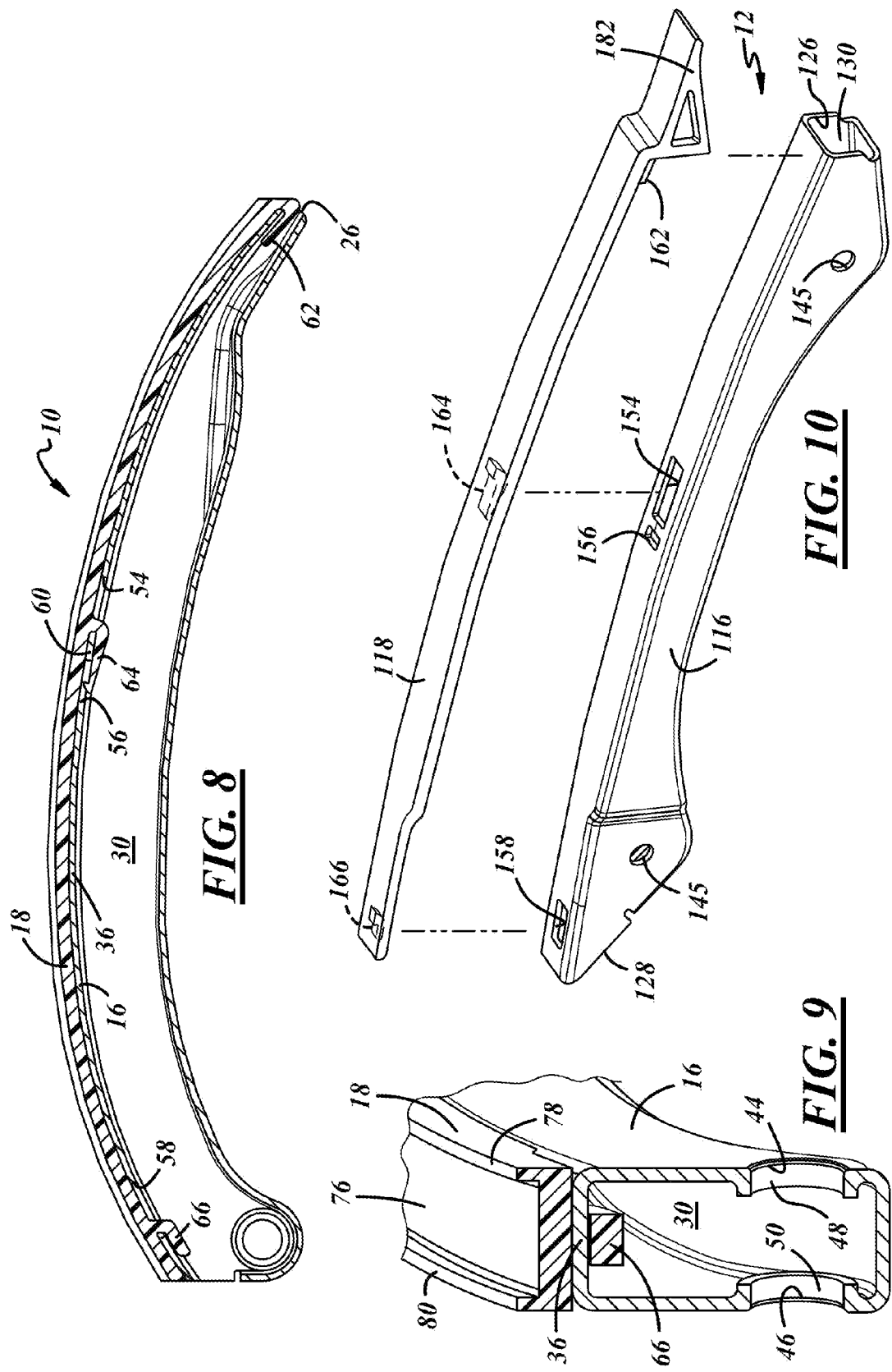

AUTOMOTIVE TIMING CHAIN SYSTEM COMPONENT AND METHOD THEREOF

This application claims the benefit of U.S. Provisional Application Ser. No. 61/156,200 filed Feb. 27, 2009.

TECHNICAL FIELD

The technical field generally relates to products including automotive timing chain system components that bear against chains of automotive timing chain systems.

BACKGROUND

An automotive timing chain system transfers rotation from a crankshaft to a camshaft in an automotive internal combustion engine, and can also drive other components such as an oil pump, water pump, and/or fuel injection pump. Components, such as tensioner arms or chain guides, are commonly used in the system to help keep an associated chain taut by taking up slack in the chain, and to help direct the chain along its path. Conventionally, the components are made by a casting, stamping, or extrusion process.

SUMMARY OF EXEMPLARY EMBODIMENTS OF THE INVENTION

One exemplary embodiment includes a product which may include an automotive timing chain system component. In use, the component may bear directly or indirectly against a chain of an automotive timing chain system. The component may have an elongated body made into a generally hollow shape by a hydroforming process. The body may have a first open free end, a second open free end, and an upper wall. The upper wall may extend along the length of the body from the first open free end to the second open free end.

One exemplary embodiment includes a product which may include a tensioner arm for an automotive timing chain system. The tensioner arm may include a body made into a generally hollow shape by a hydroforming process. The tensioner arm may also include a sliding piece mechanically interconnected to the body. In use, the sliding piece may bear directly against a chain of the automotive timing chain system.

One exemplary embodiment includes a method which may include hydroforming a body of an automotive timing chain system component into a generally hollow and elongated shape. The body may have an upper wall extending along the length of the body. The body may also have one or more opening(s) located in the upper wall. The method may include forming a sliding piece that, in use, bears directly against a chain of an automotive timing chain system. The sliding piece may have one or more finger(s). The method may include connecting the body and the sliding piece by inserting the finger(s) into the opening(s).

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 5 is a sectional view taken along line 5-5 of FIG. 4, showing a cross-sectional profile thereat.

FIG. 6a is a sectional view taken along line 6-6 of FIG. 2, showing a cross-sectional profile of a first exemplary embodiment of a body thereat.

FIG. 6b is a sectional view taken along line 6-6 of FIG. 2, showing a cross-sectional profile of a second exemplary embodiment of a body thereat.

FIG. 6c is a sectional view taken along line 6-6 of FIG. 2, showing a cross-sectional profile of a third exemplary embodiment of a body thereat.

FIG. 6d is a sectional view taken along line 6-6 of FIG. 2, showing a cross-sectional profile of a fourth exemplary embodiment of a body thereat.

FIG. 7 is an exploded view of the tensioner arm of FIG. 2.

FIG. 8 is a sectional view of the tensioner arm of FIG. 2.

FIG. 9 is a sectional view taken along line 9-9 of FIG. 2.

FIG. 10 is an exploded view of an exemplary embodiment of a chain guide.

DETAILED DESCRIPTION OF EXEMPLARY EMBODIMENTS

Figure 1:
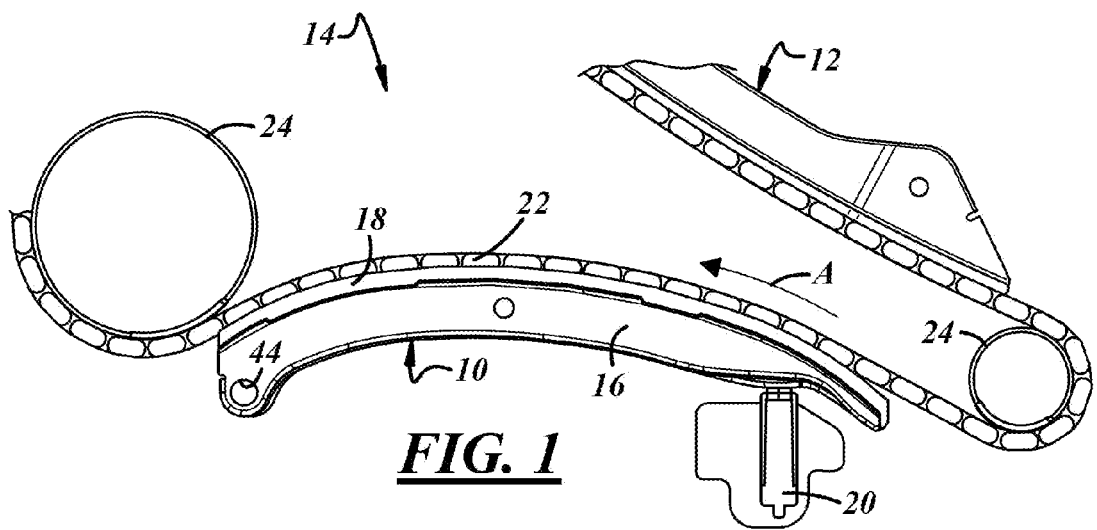
FIG. 1 is a schematic of an exemplary embodiment of an automotive timing chain system.
Figure 2:
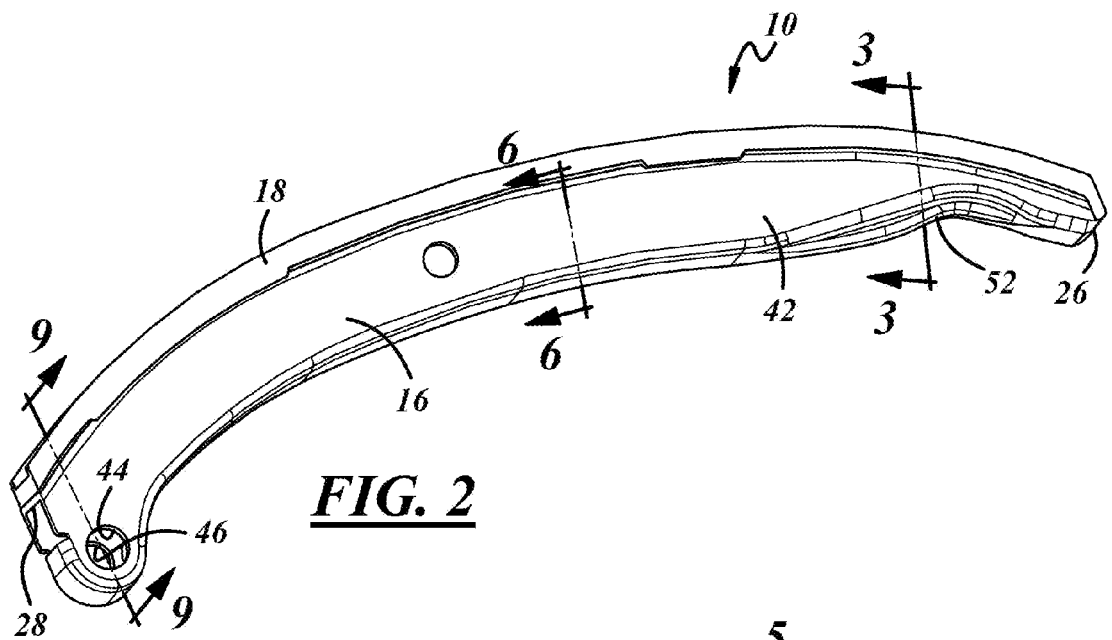
FIG. 2 is a perspective view of an exemplary embodiment of a tensioner arm.

The following description of the embodiment(s) is merely exemplary (illustrative) in nature and is in no way intended to limit the invention, its application, or uses.

The figures illustrate an exemplary embodiment of an automotive timing chain system component, such as a tensioner arm 10 or a chain guide 12, that is used in an automotive timing chain system 14 for an internal combustion engine. The component may have a body 16 and a sliding piece 18. The body 16 may be a seamless tube manufactured at least in part by a hydroforming process. The body 16 may thus be made of a lower-grade, cheaper, and/or lighter material than a conventionally cast, stamped, or extruded component while maintaining required strength and structure. The body 16 may also have a reduced size, such as a reduced height, as compared to the conventional component.

In the illustrated embodiment of FIG. 1, the automotive timing chain system 14 may include the tensioner arm 10, the chain guide 12, a plunger 20, a chain 22, and one or more idler pulleys 24. The plunger 20 may contact and exert a force against the tensioner arm 10 to keep the chain 22 taut. The plunger 20 may take many forms and arrangements including a hydraulically-actuated plunger, an electrically-actuated plunger, a mechanical-spring plunger, or another suitable type. The automotive timing chain system 14 may too take many forms and arrangements other than that described and shown here.

In the illustrated embodiment of FIGS. 1-9, the body 16 of the tensioner arm 10 may be constructed to withstand forces exerted directly or indirectly on it from the plunger 20 and from the chain 22. In one embodiment, the body 16 may have about a 1.5 mm generally uniform wall thickness, and may be made out of a relatively low-grade material such as an SAE 1008 (HRB40) steel; of course other thicknesses and materials are possible. As mentioned, the body 16 may be made primarily by a hydroforming process. Other preliminary and subsequent metalworking processes may also be performed such as bending and cutting processes. The exact hydroforming process performed may depend on, among other things, properties such as strength and wall thickness of the material used, and the desired end shape of the body 16.

In one example, a tubular blank may be initially cut to a desired size and may be placed in a hydroforming machine between a pair of die halves. The ends of the tubular blank may then be sealed. In one case, the die halves may be closed over the tubular blank, an internal hydraulic pressure may be applied inside of the blank, and the blank may expand to take on the shape of the closed die halves. In another case, a first internal hydraulic pressure may be applied inside of the tubular blank, the die halves may be progressively closed thus progressively deforming the blank, and, once completely closed, a second relatively increased internal hydraulic pressure may be applied and the blank may elongate to take on the shape of the closed die halves. The hydroforming process may differ in other cases.

Once formed, the body 16 may have a hollow shape and structure, and may be seamless along its length. The body 16 may be elongated in a longitudinal (lengthwise) direction and may extend longitudinally from a first open free end 26 to a second open free end 28. The body 16 may be curved with multiple tangent radii or may be generally straight in the longitudinal direction, and may have an internal channel 30 which may vary in cross-sectional profile in the longitudinal direction. In different embodiments, the body 16 may have different cross-sectional profiles taken near a midpoint of the lengthwise dimension. For example, in FIG. 6a the body 16 may have a cross-sectional profile of a rectangle or square. In FIG. 6b, the body 16 may have a cross-sectional profile of a square portion 32 and a necked-down portion 34 extending from the square portion. In FIG. 6c, the body 16 may taper in width from an upper wall 36 to a lower wall 38. And in FIG. 6d, the body 16 may be generally I-shaped in cross-sectional profile. Other cross-sectional profiles are possible.

The body 16 may have a first and second side wall 40, 42. A first and second hole 44, 46 may be located in the respective first and second side walls 40, 42. The first and second holes 44, 46 may be aligned with each other and may be constructed to receive a dowel pin (not shown) transversely through the body 16 and through the internal channel 30 upon assembly. In use, the body 16 may pivot at the dowel pin. Referring to FIG. 9, a first flange 48 and a second flange 50 may extend in an inwardly or outwardly direction from the respective first and second hole 44, 46. The first and second flanges 48, 50 may be formed in a metalworking process after the hydroforming process such as a dish or draw-forming process. The first and second flanges 48, 50 may increase the surface area of contact between the first and second holes 44, 46 and the dowel pin.

Figure 3:
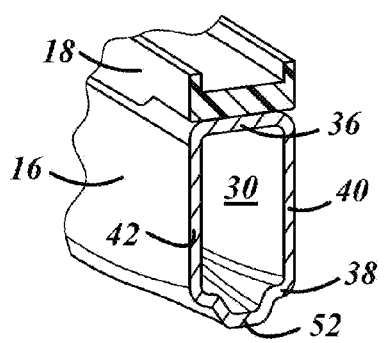
FIG. 3 is a sectional view taken along line 3-3 of FIG. 2, showing a cross-sectional profile thereat.
Figure 4:
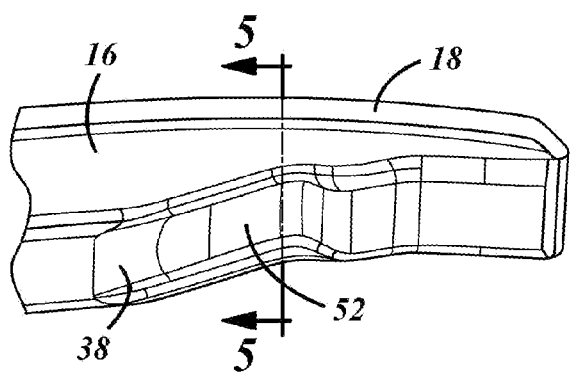
FIG. 4 is a fragmented view of an exemplary embodiment of a tensioner arm.

Referring to FIGS. 2-5, the body 16 may have a working pad or portion 52 located on the lower wall 38. In use, the working portion 52 may be acted upon and directly contacted by the plunger 20. The working portion 52 may be formed as part of the hydroforming process; that is, the shape of the working portion 52 may be designed into the die halves of the hydroforming machine. In FIG. 3, the working portion 52 may have a convex or bulged shape, and in FIG. 5, the working portion may have a concave or indented shape. Other shapes are possible and may depend on, among other things, the shape of a portion of the plunger 20 that contacts the working portion 52.

Referring to FIG. 8, the body 16 may have a first, second, and third opening 54, 56, and 58 located in the upper wall 36. The first, second, and third openings 54, 56, and 58 may receive parts of the sliding piece 18 to form a mechanical interconnection therebetween upon assembly, as will be subsequently described. The openings may have different shapes, sizes, and locations. In the illustrated embodiment, the first opening 54 may be generally rectangular and may be spaced away from the second opening 56 with a bridge 60 therebetween. The second and third openings 56, 58 may also be generally rectangular or square.

In the illustrated embodiment of FIGS. 1-9, the sliding piece 18 may bear directly against the chain 22 during use, and may provide a low friction sliding surface for the chain. In some cases, the sliding piece 18 need not be provided such as when a low friction chain 22 is used; here, the chain would bear directly against the upper wall 36 of the body 16. The sliding piece 18 may be made of nylon or another suitable material, and may be made by an injection molding process or another suitable process. The sliding piece 18 may be a separate component than the body 16, and may be mechanically interconnected to the body. Referring to FIGS. 7-9, the sliding piece 18 may have a first, second, and third protrusion or finger 62, 64, and 66 that may extend downward from a lower surface 68, and then may extend longitudinally therefrom. Upon assembly, the first finger 62 may be inserted into the first open free end 26 and into the internal channel 30. The first finger 62 may wrap around the upper wall 36 and may form a clearance-fit therewith. The second finger 64 may be first inserted into the first opening 54, and then may slide over the bridge 60 and snap into the second opening 56. And the third finger 66 may be inserted into the third opening 58. When interconnected, the sliding piece 18 may be prevented from moving in a direction A of chain movement. In other embodiments, other mechanical interconnecting structures are possible; for example, one or more openings or recesses may be located in the sliding piece and one or more complementary projections may extend from the body, or one or more openings or recesses may be located on the side walls of the body and one or more complementary projections may extend from sides of the sliding piece to be inserted therein.

The sliding piece 18 may also have a first, second, and third rim 70, 72, and 74 that may extend downward from the lower surface 68 and along edges of the sliding piece. The rims 70, 72, 74 may help locate the lateral position of the sliding piece 18 onto the body 16, and may provide support for positioning the sliding piece onto the body. On an upper surface 76, the sliding piece 18 may have a first and second flange 78, 80 extending upward from the upper surface at a respective edge thereof. The flanges 78, 80 may help locate the lateral position of the chain 22 as the chain traverses the upper surface 76.

In the illustrated embodiment of FIG. 10, the chain guide 12 may have some similarities with the tensioner arm 10 that will not be repeated in detail here. For instance, the chain guide 12 may have a body 116 that may be made by a hydroforming process to have a hollow shape and structure. The body 116 may be elongated in its longitudinal (lengthwise) direction and may extend from a first open free end 126 to a second open free end 128. The body 118 may have an internal channel 130 which may have the different cross-sectional profiles of FIGS. 6a-6d. The body 116 may have one or more hole(s) 145 for receiving a bolt to attach the body to the internal combustion engine or a structure thereof. The body 116 may also have a first, second, and third opening 154, 156, and 158 for a mechanical interconnection with a sliding piece 118. The sliding piece 118 may have a first, second, and third protrusion or finger 162, 164, and 166 that interact with the first open end 126 and first, second, and third openings 154, 156, and 158 as previously described.

The chain guide 12 may have some differences with the tensioner arm 10. For instance, the body 116 may not have a working pad or portion because the body is not acted upon by a plunger and does not pivot like the tensioner arm 10, and instead remains stationary for guiding the chain 22. The sliding piece 118 may have a triangular head 182 extending from an end of the sliding piece 118. The head 182 may be used to help prevent a tooth of the chain 22 from jumping on an associated sprocket tooth.

The bodies and sliding pieces of the tensioner arm 10 and chain guide 12 shown and described are only exemplary. Their shape, construction, configuration, and/or arrangement may vary with different applications, timing chain systems, and internal combustion engines.

The following describes various embodiments that are within the scope of the invention but the invention is not limited thereto. Embodiment 1 includes a product comprising: an automotive timing chain system component (10, 12) constructed to bear against a chain (22) of an automotive timing chain system (14), the component (10, 12) having an elongated body (16, 116) made into a generally hollow shape by a hydroforming process, the body (16, 116) having a first open free end (26, 126), a second open free end (28, 128), and an upper wall (36) extending along the length of the body (16, 116) from the first open free end (26, 126) to the second open free end (28, 128).

Embodiment 2 includes a product as set forth in embodiment 1 wherein the automotive timing chain system component (10, 12) is a tensioner arm (10).

Embodiment 3 includes a product as set forth in any one of embodiments 1 to 2 wherein the automotive timing chain system component (10, 12) is a chain guide (12).

Embodiment 4 includes a product as set forth in any one of embodiments 1-3 wherein the component (10, 12) comprises a sliding piece (18, 118) constructed to bear directly against the chain (22) and being mechanically interconnected to the upper wall (36) of the body (16, 116).

Embodiment 5 includes a product as set forth in any one of embodiments 1-4 wherein the body (16, 116) has at least one opening (54, 56, 58, 154, 156, 158) located in the upper wall (36), and the sliding piece (18, 118) has at least one finger (62, 64, 66, 162, 164, 166) inserted into the at least one opening (54, 56, 58, 154, 156, 158) upon mechanical interconnection of the body (16, 116) and the sliding piece (18, 118).

Embodiment 6 includes a product as set forth in any one of embodiments 1-5 wherein the at least one opening (54, 56, 58, 154, 156, 158) comprises a first, second, and third opening (54, 56, 58, 154, 156, 158), the at least one finger (62, 64, 66, 162, 164, 166) comprises a first, second, and third finger (62, 64, 66, 162, 164, 166), and, upon mechanical interconnection, the first finger (62, 162) is inserted into the first open free end (26, 126), the second finger (64, 164) is inserted into the first and second openings (54, 56, 154, 156), and the third finger (66, 166) is inserted into the third opening (58, 158).

Embodiment 7 includes a product as set forth in any one of embodiments 1-6 wherein the body (16, 116) has a cross-sectional profile taken at about a midpoint of its lengthwise dimension of a generally square portion (32) and a generally necked-down portion (34) extending from the square portion (32).

Embodiment 8 includes a product as set forth in any one of embodiments 1-7 wherein the body (16, 116) has a cross-sectional profile taken at about a midpoint of its lengthwise dimension of a rectangle.

Embodiment 9 includes a product as set forth in any one of embodiments 1-8 wherein the body (16, 116) has a cross-sectional profile taken at about a midpoint of its lengthwise dimension that tapers from the upper wall (36) to a lower wall (38), the upper wall (36) being wider than the lower wall (38).

Embodiment 10 includes a product as set forth in any one of embodiments 1-9 wherein the body (16, 116) has a cross-sectional profile taken at about a midpoint of its lengthwise dimension of a generally I-shape.

Embodiment 11 includes a product as set forth in any one of embodiments 1-10 wherein the body (16, 116) has at least a first and second hole (44, 46) located in a respective first and second side wall (40, 42) of the body (16, 116) for receiving a dowel pin transversely through the body (16, 116), the first and second holes (44, 46) having a respective first and second flange (48, 50) extending from the respective first and second side walls (40, 42).

Embodiment 12 includes a product comprising: a tensioner arm (10) for an automotive timing chain system (14), the tensioner arm (10) including a body (16) made into a generally hollow shape by a hydroforming process, and including a sliding piece (18) mechanically interconnected to the body (16) and constructed to bear directly against a chain (22) of the automotive timing chain system (14).

Embodiment 13 includes a product as set forth in embodiment 12 wherein the body (16) extends in a lengthwise direction from a first open free end (26) to a second open free end (28), and the body (16) has an internal channel (30) extending from the first open free end (26) to the second open free end (28).

Embodiment 14 includes a product as set forth in any one of embodiments 12-13 wherein the body (16) has a convex working portion (52) acted upon by a plunger (20) of the automotive timing chain system (14) and formed as part of the hydroforming process.

Embodiment 15 includes a product as set forth in any one of embodiments 12-14 wherein the body (16) has a concave working portion (52) acted upon by a plunger (20) of the automotive timing chain system (14) and formed as part of the hydroforming process.

Embodiment 16 includes a method comprising: hydroforming a body (16, 116) of an automotive timing chain system component (10, 12) into a generally hollow and elongated shape, the body (16, 116) having an upper wall (36) extending along the length of the body (16, 116) and having at least one opening (54, 56, 58, 154, 156, 158) located in the upper wall (36); forming a sliding piece (18, 118) for bearing against a chain (22) of an automotive timing chain system (14), the sliding piece (18, 118) having at least one finger (62, 64, 66, 162, 164, 166); and connecting the body (16, 116) and the sliding piece (18, 118) by inserting the at least one finger (62, 64, 66, 162, 164, 166) into the at least one opening (54, 56, 58, 154, 156, 158).

Embodiment 17 includes a method as set forth in embodiment 16 wherein the automotive timing chain system component (10, 12) is a tensioner arm (10), and hydroforming comprises hydroforming a convex working portion (52) acted upon by a plunger (20) of the automotive timing chain system (14) into the body (16).

Embodiment 18 includes a method as set forth in any one of embodiments 16-17 wherein the automotive timing chain system component (10, 12) is a tensioner arm (10), and hydroforming comprises hydroforming a concave working portion (52) acted upon by a plunger (20) of the automotive timing chain system (14) into the body (16).

The above description of embodiments of the invention is merely exemplary in nature and, thus, variations thereof are not to be regarded as a departure from the spirit and scope of the invention.

What is claimed is:

1. A product comprising:
an automotive timing chain system component (10, 12) constructed to bear against a chain (22) of an automotive timing chain system (14), the component (10, 12) having an elongated body (16, 116) made into a generally hollow shape by a hydroforming process, the body (16, 116) having a first open free end (26, 126), a second open free end (28, 128), and an upper wall (36) extending along the length of the body (16, 116) from the first open free end (26, 126) to the second open free end (28, 128) and wherein the body (16, 116) has a cross-sectional profile taken at about a midpoint of its lengthwise dimension of a generally square portion (32), a generally necked-down portion (34) extending from the square portion (32) and a convex working portion (52) acted upon by a plunger (20) of the automotive timing chain system (14) and formed as part of the hydroforming process.

2. A product as set forth in claim 1 wherein the automotive timing chain system component (10, 12) is a tensioner arm (10).

3. A product as set forth in claim 1 wherein the automotive timing chain system component (10, 12) is a chain guide (12).

4. A product as set forth in claim 1 wherein the component (10, 12) comprises a sliding piece (18, 118) constructed to bear directly against the chain (22) and being mechanically interconnected to the upper wall (36) of the body (16, 116).

5. A product as set forth in claim 4 wherein the body (16, 116) has at least one opening (54, 56, 58, 154, 156, 158) located in the upper wall (36), and the sliding piece (18, 118) has at least one finger (62, 64, 66, 162, 164, 166) inserted into the at least one opening (54, 56, 58, 154, 156, 158) upon mechanical interconnection of the body (16, 116) and the sliding piece (18, 118).

6. A product as set forth in claim 5 wherein the at least one opening (54, 56, 58, 154, 156, 158) comprises a first, second, and third opening (54, 56, 58, 154, 156, 158), the at least one finger (62, 64, 66, 162, 164, 166) comprises a first, second, and third finger (62, 64, 66, 162, 164, 166), and, upon mechanical interconnection, the first finger (62, 162) is inserted into the first open free end (26, 126), the second finger (64, 164) is inserted into the first and second openings (54, 56, 154, 156), and the third finger (66, 166) is inserted into the third opening (58, 158).

7. A product as set forth in claim 1 wherein the body (16, 116) has a cross-sectional profile taken at about a midpoint of its lengthwise dimension of a rectangle.

8. A product as set forth in claim 1 wherein the body (16, 116) has a cross-sectional profile taken at about a midpoint of its lengthwise dimension that tapers from the upper wall (36) to a lower wall (38), the upper wall (36) being wider than the lower wall (38).

9. A product as set forth in claim 1 wherein the body (16, 116) has at least a first and second hole (44, 46) located in a respective first and second side wall (40, 42) of the body (16, 116) for receiving a dowel pin transversely through the body (16, 116), the first and second holes (44, 46) having a respective first and second flange (48, 50) extending from the respective first and second side walls (40, 42).

10. A product comprising:
a tensioner arm (10) for an automotive timing chain system (14), the tensioner arm (10) including a body (16) having a cross-sectional profile taken at about a midpoint of its lengthwise dimension of a generally square portion (32), a generally necked-down portion (34) extending from the square portion (32) and a convex working portion (52) by a hydroforming process, and including a sliding piece (18) mechanically and removably interconnected to the body (16) and constructed to bear directly against a chain (22) of the automotive timing chain system (14).

11. A product as set forth in claim 10 wherein the body (16) extends in a lengthwise direction from a first open free end (26) to a second open free end (28), and the body (16) has an internal channel (30) extending from the first open free end (26) to the second open free end (28).

12. A product as set forth in claim 10 wherein the body (16) has a convex working portion (52) acted upon by a plunger (20) of the automotive timing chain system (14) and formed as part of the hydroforming process.

13. A method comprising:
hydroforming a body (16, 116) of an automotive timing chain system component (10, 12) into a generally hollow and elongated shape, the body (16, 116) having an upper wall (36) extending along the length of the body (16, 116), a generally square portion (32), a generally necked-down portion (34) extending from the square portion (32) and a convex working portion (52), and having at least one opening (54, 56, 58, 154, 156, 158) located in the upper wall (36);
forming a sliding piece (18, 118) for bearing against a chain (22) of an automotive timing chain system (14), the sliding piece (18, 118) having at least one finger (62, 64, 66, 162, 164, 166); and
connecting the body (16, 116) and the sliding piece (18, 118) by inserting the at least one finger (62, 64, 66, 162, 164, 166) into the at least one opening (54, 56, 58, 154, 156, 158).

* * * * *